Patented July 9, 1935

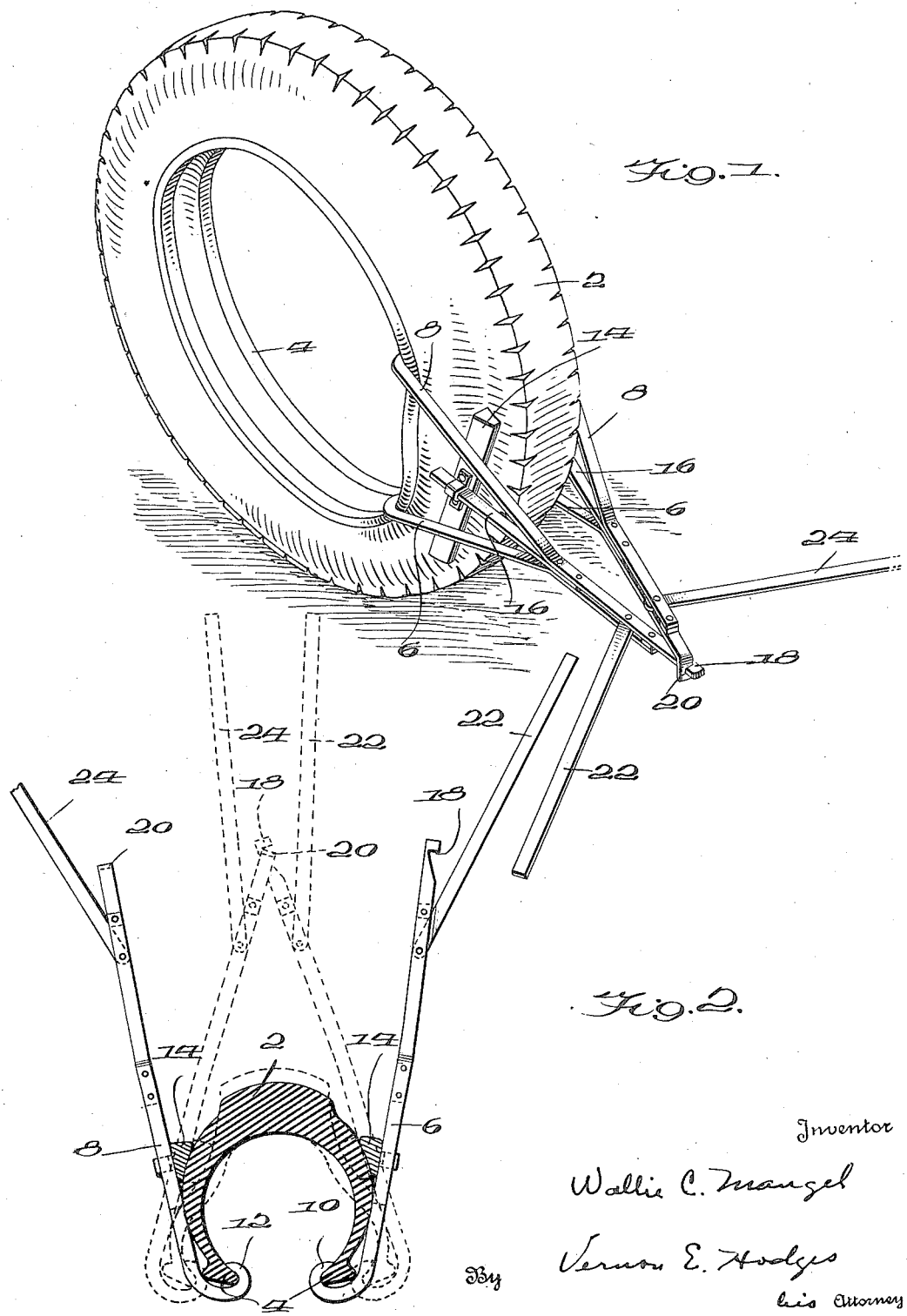

2,007,870

UNITED STATES PATENT OFFICE 2,007,870

TIRE SPREADER

Wallie C. Mangel, Monteagle, Tenn., assignor to Braden N. Mulford, Fountain Head, Tenn.

Application November 28, 1934, Serial No. 755,201

4 Claims. (Cl. 152—27)

My invention relates to an improvement in tire spreaders.

In handling automobile tires, particularly the tires for busses and trucks, it is necessary to expand the tire-shoe in order to remove the inner tube if the tire has been punctured and the inner tube must be repaired.

Very often the tire-shoes are made of such heavy stock that it is difficult for the operator to open the shoe and remove the inner tube therefrom. This is particularly the case when working on busses and truck tires.

The object of my invention is to provide a simple and light-weight tool which may be easily used to expand a tire-shoe by spreading the beading which engages a tire rim.

A further object of my invention is to provide a tool which is readily adjustable so that it may be used on either large or small tires.

A still further object of my invention is to provide a tire spreading tool, the handles of which are adapted to serve as legs to support a tire in an upright position while it is being worked upon.

In the accompanying drawing:

Fig. 1 is a perspective view showing my tire expander tool holding a tire in expanded position; and Fig. 2 is a cross-section through a tire showing my tool engaging the tire preparatory to its expansion.

The tire 2 is of ordinary pneumatic tire construction having a flange beading 4.

My tool is substantially Y-shaped in configuration having two projecting arms 6 and 8, on the ends of which are provided hooks 10 and 12, which hooks are adapted to engage the tire flange beading 4 when the tire is to be expanded for the removal or insertion of an inner tube.

After the hooks 10 and 12 have been engaged over the flange beading 4, the slidably adjustable cross-bar 14 is slid to a position on the rod 16 which extends between the arms 6 and 8, so that it will properly engage the side walls of the tire 2.

The end of one of the Y-shaped tools remote from the arms 6 and 8 is provided at its end with a notch 18 which is adapted to engage the L-shaped end 20 of a correspondingly Y-shaped tool.

At a point midway between the notch 18 and the L-shaped end 20 and the crotch of the arms 6 and 8, I provide extension-handles 22 and 24 which are hingedly secured to the Y-shaped tools.

After the tools have been hooked into the flange beading 4, and the cross-bars 14 have been adjusted to their proper position against the side walls of the tire 2, as shown in Fig. 2, the extension-handles 22 and 24 are drawn together, and the L-shaped end 20 of one tool is engaged within the notch 18 of the other tool, as shown in dotted lines in Fig. 2. After the notch 18 and the L-shaped end 20 have been engaged, the tire will be sufficiently expanded so that the inner tube may be removed to be repaired, or the tire shoe itself may be repaired. When the tool is in this position, the extension-arms 22 and 24 may be hinged outwardly, as shown in Fig. 1, and may serve as legs to hold the tire 2 in an upright position, such as the position illustrated in Fig. 1.

By the use of this simple construction, I have been enabled to make a light-weight and strong tire expanding tool which may be folded into a comparatively small space by means of hinging the handle-members 22 and 24 back against the Y-shaped arms 6 and 8. Also by the use of the adjustable cross-arm 14, it is possible to use my tool on tires of varying size, the cross-arm 14 being adjustable to any desired position against the side wall of the tire 2.

It will be understood that minor changes may be made in the construction of my tool without departing from the spirit of the invention and the scope of the appended claims.

I claim:

1. A tool of the character described including two substantially Y-shaped arms, hooks on the ends of the dual projections of said arms, a rod extending between said dual projections, a cross-bar slidable on said rod, and locking means on the ends of the Y-shaped arms remote from the said dual projections.

2. A tool of the character described including two substantially Y-shaped arms, hooks on the ends of the dual projections of said arms, a rod extending between said dual projections, a cross-bar slidable on said rod, and locking means on the ends of said Y-shaped arms remote from the said dual projections, and extensions hingedly secured to the ends of the arms in close proximity to the locking means.

3. In a tire expanding tool, two substantially Y-shaped arms, hooks on said arms to engage the beading of the tire, a cross-bar slidably secured to rods between the arms on which the hooks are secured, locking means on the legs of the Y-shaped arms remote from said hooks, and means for drawing said locking means together.

4. The combination with a pair of arms having gripping means at one end and fastening means at the other, fulcrum-bars slidably connected with said arms and adapted to embrace opposite sides of a tire while the gripping means engage the beading thereof, and means for facilitating drawing the opposite or fastening ends of the arms to a fastened position, in that way separating and holding the beading of the tire apart.

WALLIE C. MANGEL.